(12) United States Patent
Brooks et al.

(10) Patent No.: US 7,991,767 B2
(45) Date of Patent: *Aug. 2, 2011

(54) METHOD FOR PROVIDING A SHARED SEARCH INDEX IN A PEER TO PEER NETWORK

(75) Inventors: David A. Brooks, Providence, RI (US); Niklas Heidloff, Salzkotten (DE); Hong Dai, Westford, MA (US); Craig R. Wolpert, Holliston, MA (US); Igor L. Belakovskiy, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 416 days.

This patent is subject to a terminal disclaimer.

(21) Appl. No.: 11/118,968

(22) Filed: Apr. 29, 2005

(65) Prior Publication Data
US 2006/0248067 A1    Nov. 2, 2006

(51) Int. Cl.
*G06F 7/00* (2006.01)
*G06F 17/30* (2006.01)
*G06F 13/14* (2006.01)

(52) U.S. Cl. .................... 707/715; 707/705; 707/713

(58) Field of Classification Search .............. 707/1–10, 707/705, 713, 715; 709/202–245; 705/1
See application file for complete search history.

(56) References Cited

U.S. PATENT DOCUMENTS

| | | | |
|---|---|---|---|
| 5,706,365 A | 1/1998 | Rangarajan et al. | |
| 6,360,215 B1 * | 3/2002 | Judd et al. ..................... | 707/3 |
| 6,374,241 B1 | 4/2002 | Lamburt et al. | |
| 6,636,854 B2 * | 10/2003 | Dutta et al. ..................... | 707/10 |
| 6,675,205 B2 * | 1/2004 | Meadway et al. ............ | 709/219 |

(Continued)

OTHER PUBLICATIONS

Hohensee et al, Interchangable & Durable Document Index Structure for Presentation Document, IBM Dossier, TUC919930038. (Aug. 31, 1993).

(Continued)

*Primary Examiner* — Cam Y Truong
*Assistant Examiner* — Cecile Vo
(74) *Attorney, Agent, or Firm* — David A. Dagg (57) ABSTRACT

A method and system for sharing search index entries across multiple computer systems organized in a peer to peer network, in which unique content is indexed only once, even though the content may be physically duplicated in multiple computer systems in the peer to peer network. When files are obtained by a shared indexing service, and a determination is made as to whether the received files are duplicates with regard to previously indexed files. If a file is determined to be a duplicate, the index representation of the previously indexed copy of the file is modified to indicate that the file is also associated with another computer system in the peer to peer network. If a file is not a duplicate of a previously indexed file, the file is indexed to support future searches. The index representation of a file includes category identifiers associating one or more computer systems with the file. When a file is indexed, one or more category identifiers are generated and stored in association with that file. The category identifiers for an indexed file may represent host computer systems on which copies of the file are stored. The category identifiers enable location specific searching by computer systems in a peer to peer network sharing a common search index. A software category filter may be provided to process search results from the shared search index, so that only files associated with certain categories are returned.

22 Claims, 6 Drawing Sheets

U.S. PATENT DOCUMENTS

| | | | |
|---|---|---|---|
| 7,032,000 B2 * | 4/2006 | Tripp | 709/202 |
| 7,206,934 B2 * | 4/2007 | Pabla et al. | 713/168 |
| 7,310,629 B1 * | 12/2007 | Mendelson et al. | 707/3 |
| 7,624,179 B2 * | 11/2009 | Teodosiu et al. | 709/225 |
| 2002/0156917 A1 * | 10/2002 | Nye | 709/238 |
| 2003/0110162 A1 | 6/2003 | Newman | |
| 2004/0024778 A1 | 2/2004 | Cheo | |
| 2004/0078750 A1 | 4/2004 | Frank | |
| 2004/0133609 A1 | 7/2004 | Moore et al. | |
| 2004/0143569 A1 | 7/2004 | Gross et al. | |
| 2004/0177319 A1 | 9/2004 | Horn | |
| 2005/0015466 A1 * | 1/2005 | Tripp | 709/219 |
| 2005/0131894 A1 * | 6/2005 | Vuong | 707/5 |
| 2007/0033262 A1 * | 2/2007 | Labelle et al. | 709/217 |

OTHER PUBLICATIONS

Nelson, System and Method for Automatically Linking Items with Multiple Attributes to Multiple Levels of Folders within a Content Management System, IBM Dossier SVL920020098. (Nov 27, 2002).

* cited by examiner

METHOD FOR PROVIDING A SHARED SEARCH INDEX IN A PEER TO PEER NETWORK

FIELD OF THE INVENTION

The present invention relates generally to systems for storing and accessing electronic data files that are shared or duplicated by multiple computer systems, and more particularly to a method and system for providing a shared search index in a peer to peer network.

BACKGROUND OF THE INVENTION

In recent years, communications environments referred to as "peer to peer" networks have become increasing common. Generally, a peer to peer network enables multiple computer systems to share files that they store. Peer to peer networks may be used in any environment in which it is inconvenient or impractical to share files using a dedicated file server. Client versions of many contemporary operating systems allow files to be shared between client systems over a network. In addition, several well known examples of peer-to-peer network applications operate over the Internet, allowing users to share files stored on their local hard disks, and essentially creating global peer-to-peer networks. Often used for sharing music files, this widely distributed approach to file sharing was popularized by the famous Napster service, as well as Gnutella, Grokster, KaZaA, and others.

While specific file sharing systems have been architected in different ways, they all allow users to search for a desired file or files. If a desired file is present within the peer to peer network, the search results indicate user names or links associated with one or more computer systems from which the file can be downloaded. For example, a user name or "handle" associated with a computer system may be returned if a copy of the desired file is currently hosted on that system. The user that issued the search can then request that a copy of the desired file be downloaded onto his or her local hard drive from one of the remote hosting computer systems indicated in the search results.

As it is generally known, in order to improve search operation performance, it is often useful to create and maintain a data structure referred to as a "search index". A search index enables efficient matching between tokens in a search query and files associated with or containing those tokens. For a file to be represented in a search index, it must go through an "indexing" step, resulting in information describing the file being added to the index.

Unfortunately, indexing large numbers of files is expensive both in terms of CPU utilization and in the size of the search index. For each file indexed, multiple processing steps may be required, such as format conversion, language detection, tokenization, and insertion into the index. These actions often consume significant processor and storage resources.

In a peer to peer network, physically distributed computer systems belonging to the network operate independently, but may share centrally provided resources. One such shared resource is often a network wide search service, which may include a search index to improve search performance. Accordingly, files stored on the system are passed to an indexing process that maintains the search index. However, multiple copies of a single file are often hosted on different systems in the peer to peer network. Such duplicate copies may cause a single file to be re-indexed for each location at which a copy is stored. This is disadvantageous, resulting in identical content being re-indexed. It would be desirable to eliminate such unnecessary processing and resource consumption to improve the performance of a shared indexing service in a peer to peer network.

SUMMARY OF THE INVENTION

To address the above described and other shortcomings of previous systems, a method and system for sharing search index entries across multiple computer systems within a peer to peer network is disclosed. In the disclosed system, unique content is indexed only once, even though the content may be physically duplicated in multiple computer systems in the peer to peer network. Files are obtained by a shared indexing service, and a determination is made as to whether the received files are duplicates with regard to previously indexed files. If a file is determined to be a duplicate, the index representation of the previously indexed copy of the file is modified to indicate that the file is also stored on another computer system in the peer to peer network. If a file is not a duplicate of a previously indexed file, the file is indexed to support future searches and/or other processing. Determination of whether a file is a duplicate may be accomplished based on file identifiers generated from file metadata, and/or based on all or part of the file contents itself. Accordingly, a file identifier may be generated and stored for comparison with identifiers of subsequent files that are candidates for indexing.

The index representation of a file includes category identifiers associating the file with one or more locations within the peer to peer network. When a file is indexed, one or more category identifiers are generated and stored in association with that file. The category identifiers for an indexed file may, for example, represent a computer system on which a copy of the file is currently hosted. In addition to eliminating the need to re-index multiple copies of the same file, the category identifiers enable location specific searching by users of the peer to peer network. A software category filter may be provided to process search results from the shared search index, so that only files associated with certain locations are returned. Accordingly, one or more search categories may be determined for a given search query, based on user inputs, or some other context information, and then used to filter the search results provided from the shared search index.

The disclosed system provides a framework for efficiently sharing a previously indexed file between computer systems in a peer to peer network, in which underlying search index data is transformed without requiring re-indexing. Since copying a file between locations typically does not change the contents of the file, the disclosed system improves shared indexing service performance.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
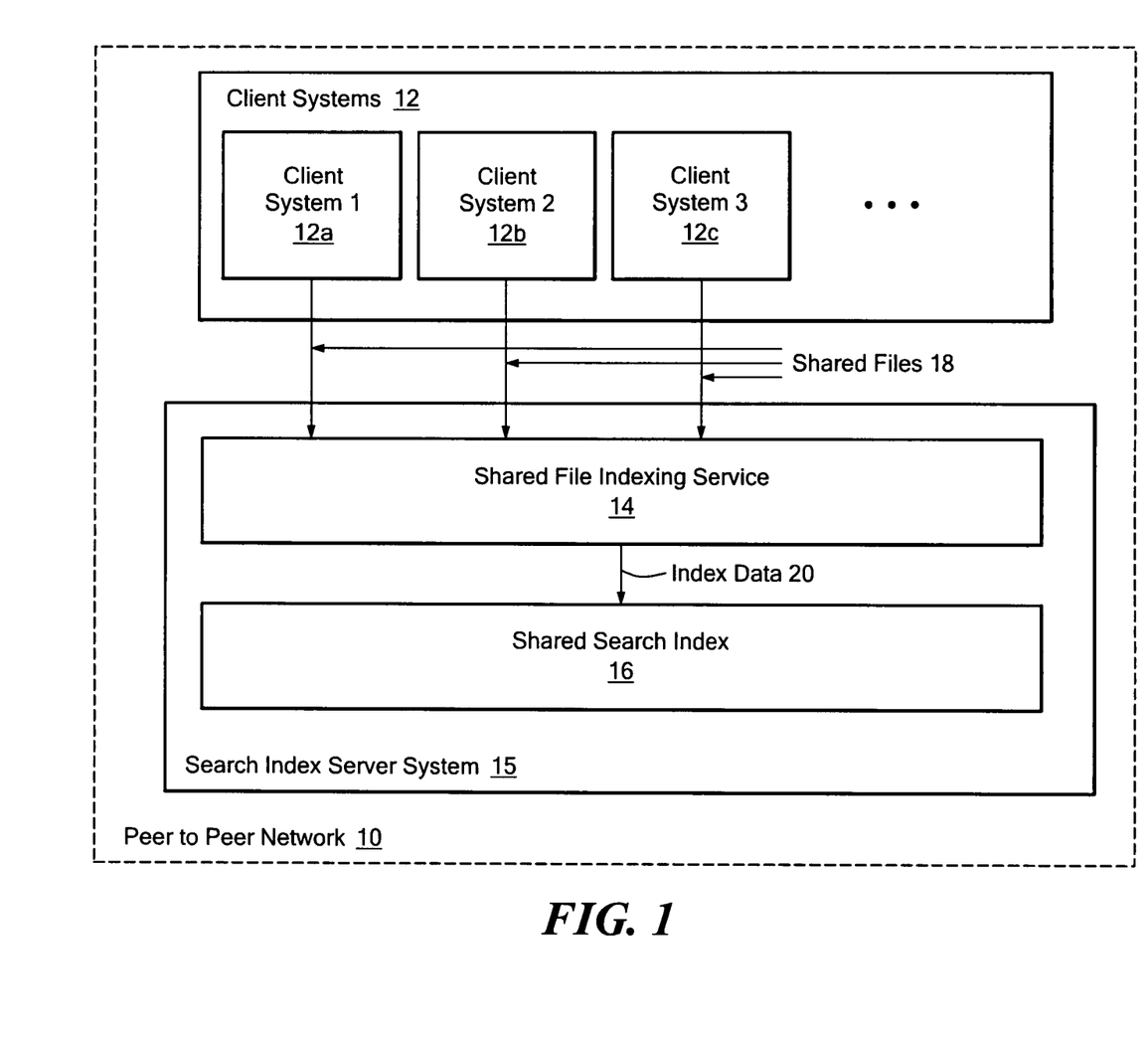
FIG. 1 is a first block diagram illustrating the structure and operation of software components in an illustrative embodiment of the disclosed system.

As shown in FIG. 1, an illustrative embodiment of the disclosed system operates in a peer to peer network 10, using a number of software components executing on at least one computer system, shown for purposes of illustration as client systems 12 and the search index server system 15. The client systems 12 and search index server system 15 may, for example, each include at least one processor, program storage, such as memory, for storing program code executable on the processor, and one or more input/output devices and/or interfaces, such as data communication and/or other peripheral devices and/or interfaces. The client systems 12 and search index server system 15 may each further be embodied as one or more physically distributed computer systems, and are communicably connected by a data communication system, such as a Local Area Network (LAN), the Internet, or the like. The client systems 12 and search index server system 15 may each further include appropriate operating system software.

In the embodiment of FIG. 1, a number of client computer systems 12 are shown, for purposes of illustration, including client system 1 12a, client system 2 12b, and client system 3 12c. The disclosed system may operate to support client computer systems of any specific type, and of any specific number. The client systems 12 each store (or "host") some number of shared electronic files, which are shareable with other ones of the client systems 12. The client systems 12 may store the files in any specific manner, for example on a hard drive storage device. The files stored within the client systems 12 may be stored within a file system provided by operating system software, or within an application specific database associated with the peer to peer network 10, or in any other specific manner.

The shared files stored on the client systems 12 may be any specific type of file. For example, the shared files 18 shown in FIG. 1 may include audio files, such as MP3 files, and/or video files of various types and formats. Those skilled in the art will recognize that the principles of the invention are applicable to any specific type of shared file.

The shared indexing service 14 is a software process that obtains the shared files 18 from the client systems 12 in order to maintain the shared search index 16 by providing index data 20 to be stored in the shared search index 16. The indexing service 14 may obtain the shared files 18 in various specific ways, as appropriate for a given embodiment. For example, indexing service may periodically check for new files stored on the client systems 12. Alternatively, or in addition, the indexing service 14 may detect when a file is moved from one to another of the client systems 12, and perform indexing on the file in response to such an event. As a result, the indexing service 14 operates to maintain indexing information in the search index 16 for shared files 18 stored in the client systems 12.

When it indexes a file, the indexing service 14 stores category information in the search index 16 indicating which ones of the client systems 12 the file is to be associated with. The category information stored by the indexing service 14 enables the search index to be used independently by each of the client systems 12, without requiring re-indexing of files stored on multiple ones of the client systems 12.

In the disclosed system, content is indexed only once, even though the same content may be physically duplicated in multiple client systems. For example, if the indexing service 14 obtains a file from client system 1 12a, it stores category information in the shared index 16 indicating that a copy of the file is stored on that client system. If the file is subsequently copied from client system 1 12a to client system 2 12b, it may again be obtained for indexing, this time from client system 2 12b. The indexing service 14 would determine that the file has previously been indexed, and need not be indexed again. In addition, the indexing service 14 would store category information in the shared index 16 indicating that the file is also stored by client system 2 12b.

Figure 2:
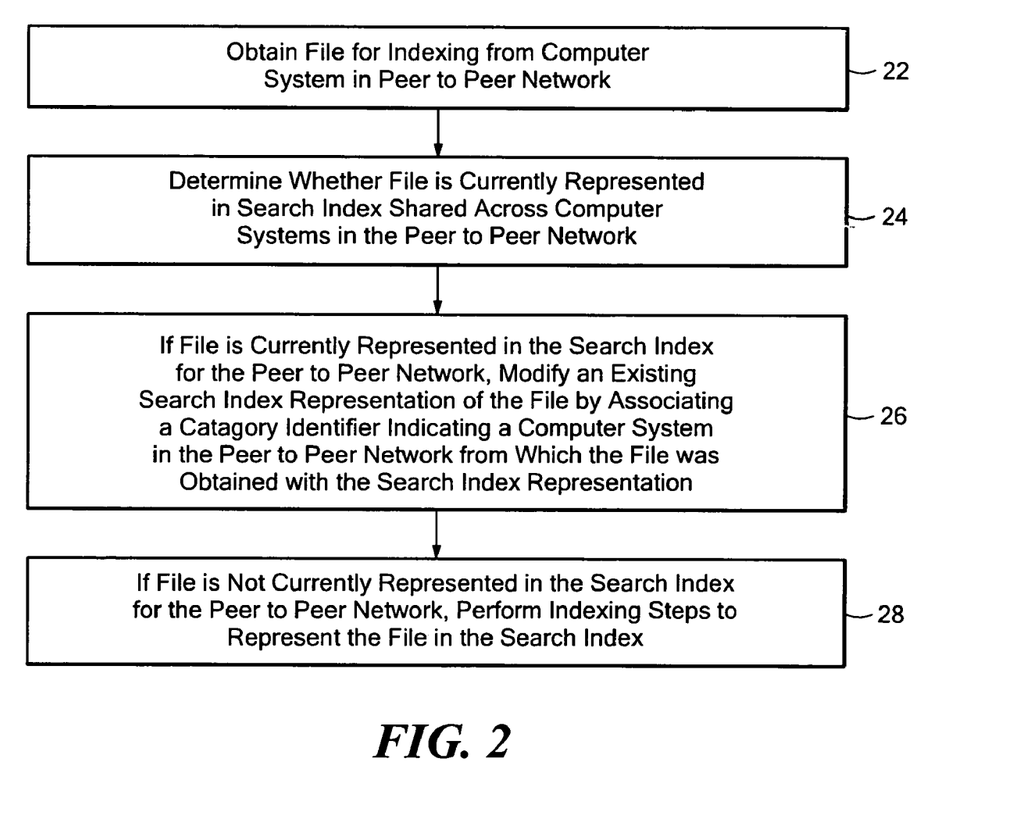
FIG. 2 is a flow chart showing steps performed by an embodiment of the disclosed system.

FIG. 2 is a flow chart illustrating steps performed by an embodiment of the disclosed system to process an electronic file received for indexing from a computer system that is a member of a peer to peer network. At step 22, the disclosed system obtains a file to be indexed into an index shared across the multiple computer systems in the peer to peer network. A file may be passed to an indexing service provided by the disclosed system in various specific ways. For example, a file may be pushed to the indexing service by one of the client computer systems, or the indexing service could call up to one of the client computer systems to pull down any recently copied or modified files that are stored on that system. Other models for collecting the files to be indexed may also be used.

At step 24, a determination is made as to whether a copy of the file obtained at step 22 has been previously indexed, and the file is therefore already represented in a shared search index. If so, the file need not be re-indexed, and step 24 is followed by step 26, in which category information in the shared search index is modified as necessary to indicate the location of the file copy. For example, if the file obtained at step 22 was obtained from a second client computer system, but a copy of the file had previously been indexed from a first client computer system, then at step 26 the category information for the file in the shared search index would be modified to also associate the file with the second client computer system.

Otherwise, if the file had not been previously indexed, the file must be indexed, and at step 28 the index information for the file is stored in the shared search index in association with appropriate category information indicating the client computer system on which the file is stored. For example, if the previously un-indexed file obtained at step 2 was obtained from a given client computer system, then the category information stored for the file in the shared search index would indicate that client computer system.

The disclosed system eliminates the need to re-index files in many situations where copies of a file are stored by multiple client computer systems. One example of such a situation arises in the context of a peer to peer network in which multiple computer systems share a common search index, and users keep local copies of a single file on their own systems. File categories may be used to enable client computer systems to share a single search index by providing a filter on search results. When a previously indexed file is received for indexing, the disclosed system does not re-index the file's contents. The detection of a previously indexed file may, for example, be accomplished by participation in a network wide, unified process allowing files to be copied between client computer systems. Such detection may further be accomplished by storing a unique hash of each file in the shared index, enabling identification of identical, previously indexed content prior to indexing a newly received file for purposes of representation in the index.

Figure 3:
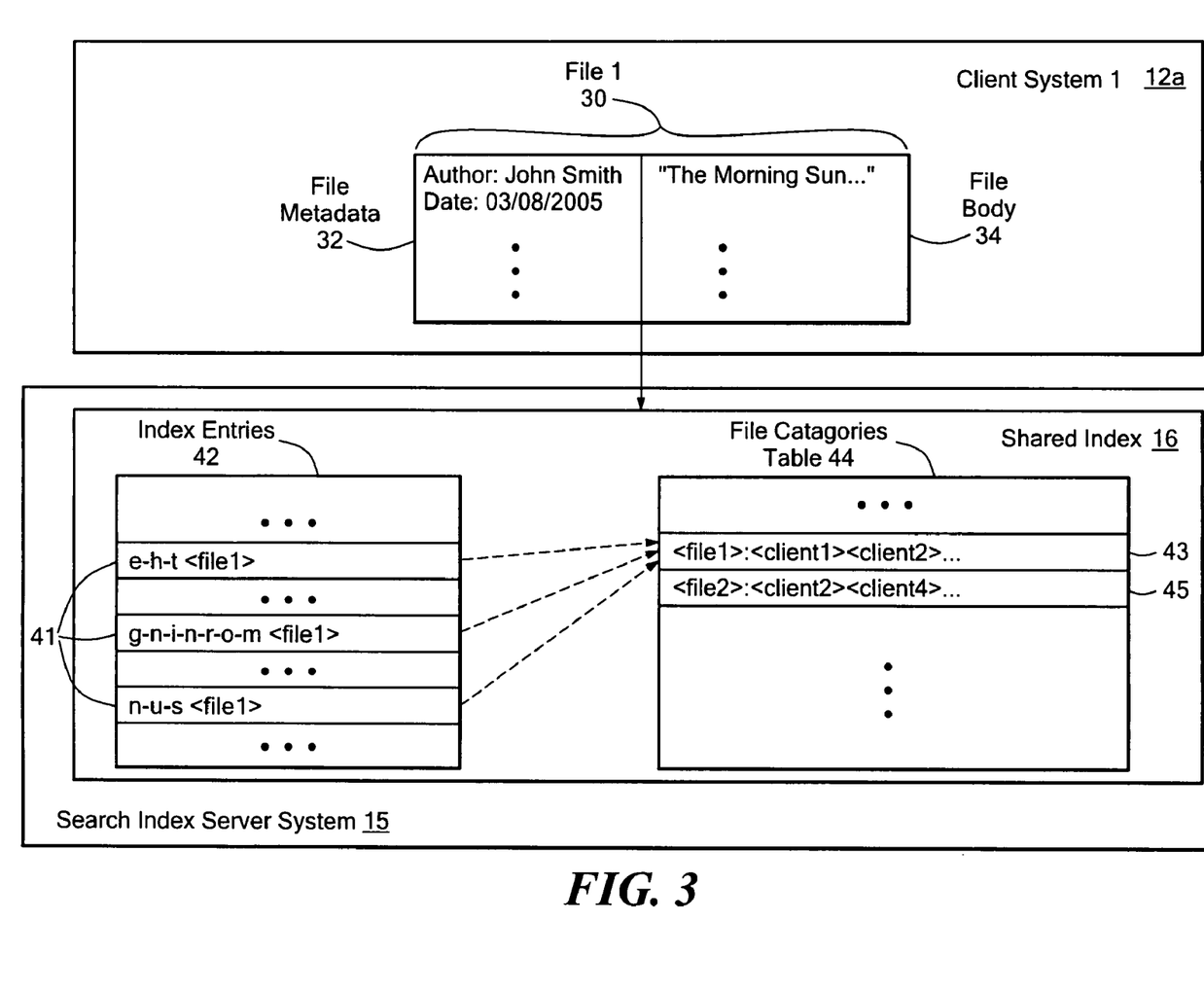
FIG. 3 is a second block diagram illustrating the structure and operation of software components in an illustrative embodiment of the disclosed system.

FIG. 3 shows an example of a file, shown as File2 30, stored within the client system 1 12a. The File1 30 may consist of a music file, video file, or some other type of shared file. The File1 30 is shown including a body 34 and file metadata 32. As shown in FIG. 3, the file is associated with the text "The Morning Sun". The text "The Morning Sun" may be contained within the body of the file, or within the metadata for the file. For example, the text "The Morning Sun" may be a file name or title associated with File1 30. For purposes of illustration, the text "The Morning Sun" is shown within the body 34 of the File1 30, but may alternatively be contained within the file metadata 32. The file metadata 32 may further include information about the File1 30 such as an indication that John Smith is an artist associated with the file, and a date associated with the file, such as the date the file was originally stored.

After processing by an embodiment of the disclosed indexing service, index data representing the File1 30 is stored in the shared index 16. For purposes of illustration and explanation, the shared index 16 is shown including index entries 42. The index entries 42 in FIG. 3 are an example of a search index data structure that enables efficient searching across an associated set of files. The index entries 42 may make up or form part of what is sometimes referred to by computer scientists as a "trie", from the word "retrieval". While the disclosed system may be embodied using a trie data structure, it is not limited to such an embodiment, and any other specific type or structure may be used for the shared index 16. The index entries 42 are used to store an index "profile" of the file 30.

In the example of FIG. 3, the index entries 42 associate the words "the", "morning", and "sun" with an entry 43 for File1 30, in a file categories table 44. As in one conventional practice, matching of text strings in the index entries 42 is done in reverse character order; "the" is therefore matched by the entry containing "e-h-t", "morning" by "g-n-i-n-r-o-m", etc. The entries 41 in index entries 42 representing File1 30 may further include various other attributes associated with File1 30 as appropriate for a given embodiment.

In the example of FIG. 3, the entries 41 in the index entries 42 are associated with the File1 30 by the identifier "<file1>", which also identifies the relevant entry 43 in the file categories table 44. As further shown in the example of FIG. 3, the File1 30 is associated by the entry 43 with a number of client computer systems including a client computer system 1 ("<client1>"), and client computer system 2 ("<client2>"). The entry 43 thus indicates that copies of File1 30 are stored on client computer system 1 and client computer system 2. Another entry 45 associates a shared file having an identifier "<file2>" with client computer system 2 and a client computer system 4, on which copies of that shared file are stored. Any specific technique or structure may be used to associate files with the computer systems on which they are stored within the shared index 16.

Advantageously, after a file has been indexed by the disclosed system, copies of that file need not be re-indexed. Accordingly, the index entries 42 need not be modified when a copy or duplicate of a file is passed to the indexing system, or when a file is copied from one computer system to another. In order to determine whether a file passed to the indexing has previously been "profiled", such that information representing the file has already been stored in the index entries 42, information stored in the file categories table 44 may be checked. For example, if there is no entry in the file categories table 44 for an obtained file, that may provide indication that the file has not previously been indexed. Alternatively, hash codes or the like, generated based on portions of the content of or metadata associated with previously indexed files, may be stored in the file categories table 44 or other data structure associated with the shared index 16. These codes may then be compared with those generated based on newly obtained files to determine whether the newly obtained files have previously been indexed.

Figure 4:
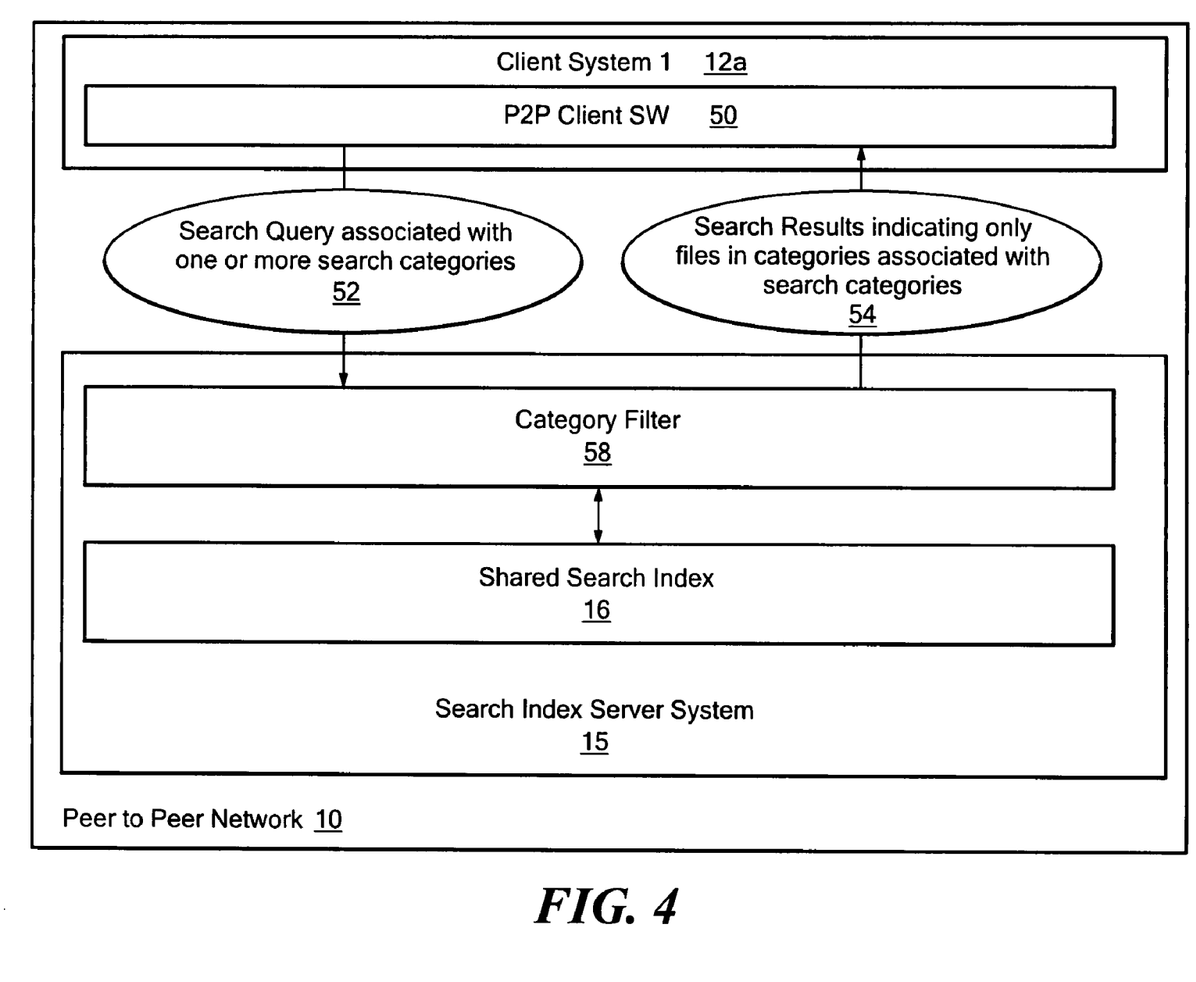
FIG. 4 is a third block diagram illustrating the structure and operation of software components in an illustrative embodiment of the disclosed system.

FIG. 4 shows the structure and operation of software components for performing category based searches in an illustrative embodiment of the disclosed system. As shown in FIG. 4, a computer system in a peer to peer network, shown for purposes of illustration as client system 1 12a, includes peer to peer client software 50 that issues a search query 52. The search query 52 contains a text search string for matching, and is associated with one or more search categories. For example, a category associated with the search query 52 may be automatically generated to reflect the specific physical location of the client system 1 12a, in order to obtain indications of other computer systems in the peer to peer network where copies of the desired file are stored, and that are relatively close in distance from the requesting system. Alternatively, the search query 52 may itself expressly include or indicate one or more search categories, which may be entered by a user through a graphical user interface or other technique.

The search query 58, including its search string and associated search category information, is processed through the category filter 58, using information stored in the shared search index 16. As shown in FIG. 4, the category filter 58 and shared search index 16 may, for example, be contained in a search index server system 15. The category filter 58 operates to provide search results 54, indicating only files associated with file categories that are also associated with the search query 52. Accordingly, if a specific client system generates the search query 52, such as client system 1 12a, then the category filter 58 may operate to provide search results 54 indicating only those files matching the search string and having category information indicating a physical proximity to the client system 1 12a. Search queries may indicate multiple search categories, in which case the category filter 58 provides search results across all such categories.

Figure 5:
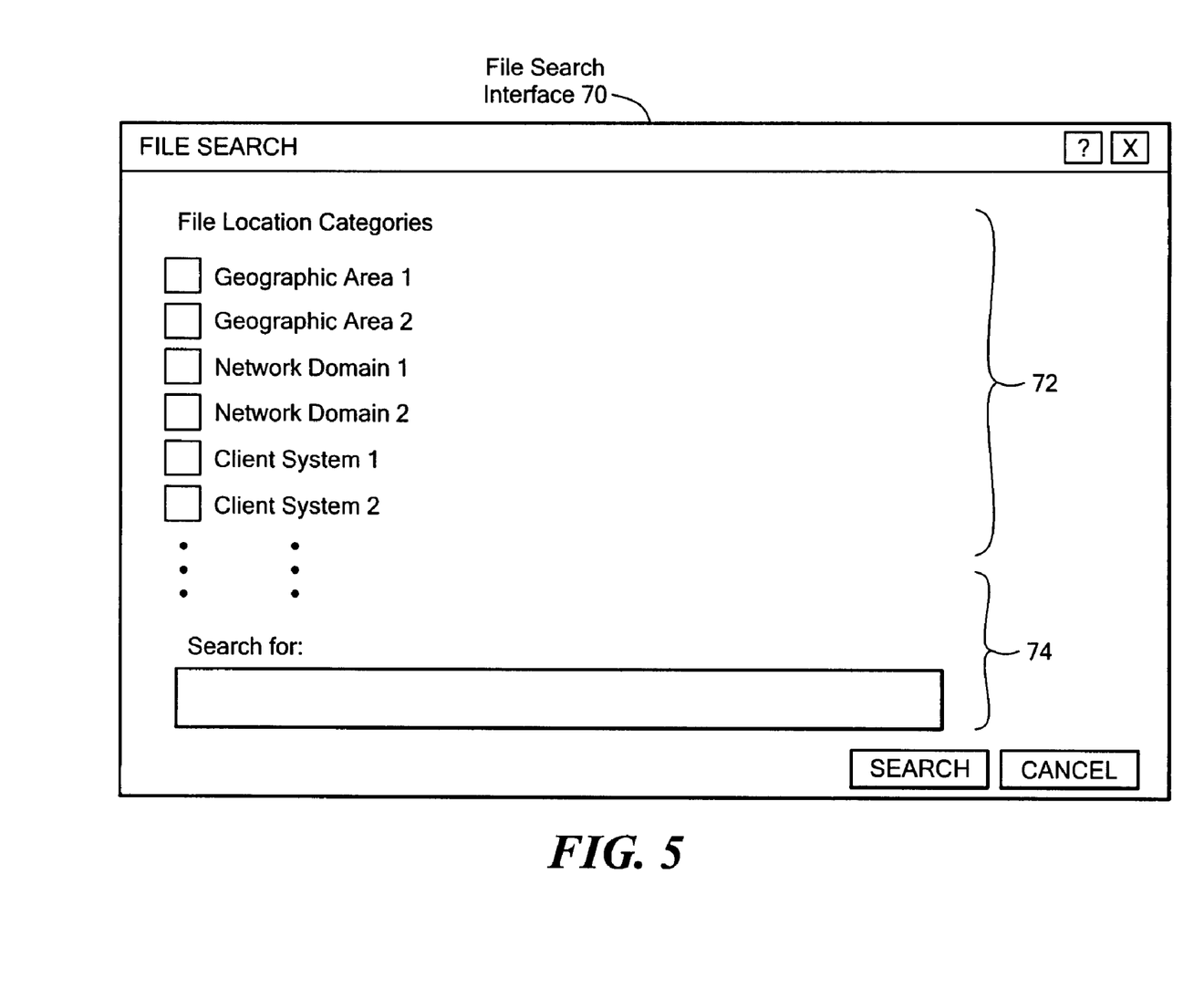
FIG. 5 is a screen shot showing a simplified example of a graphical user interface generated by an embodiment of the disclosed system.

FIG. 5 is a screen shot showing a simplified example of a graphical user interface generated by an embodiment of the disclosed system. As shown in FIG. 5, the file search interface 70 includes a location indication interface 72, shown for purposes of illustration as including check boxes for a user to indicate one or more location options, which may map or automatically be mapped to specific individual categories or sets of associated categories. The search performed is for files matching a search string provided in the "Search for" portion 74 of the interface 70.

As shown in FIG. 5, the user may indicate that the search is to be performed over those client computer systems located within a specific geographic area. For example, a user may indicate a first geographic area "Geographic Area 1", which would result in a search being performed across computer systems located within a predetermined geographic area associated with that label.

Searches may also be limited to computer systems within specific network or Internet domains, as illustrated in FIG. 5 by the "Network Domain 1" and "Network Domain 2" options. Similarly, a user may indicate that the search for a desired file should be performed on specific client computer systems, as illustrated in FIG. 5 by the "Client System 1" and "Client System 2" options. In an embodiment in which individual categories map to specific client computer systems, selection of the "Client System 1" and/or "Client System 2" would result in searches for files with category identifiers corresponding to the indicated client computer system or systems.

Those skilled in the art will recognize that various specific composite category sets may be provided for user selection through a file search interface such as that shown in FIG. 5, as well as various individual application categories.

While a user interface 70 is shown in FIG. 5 as one example of how categories may be associated with a search query, the present invention is not limited to such an embodiment. Accordingly, embodiments of the disclosed system may use other techniques for associating categories with search queries, that may be transparent to a user, based on configuration information, user settings, or any other appropriate technique for a given embodiment, implementation or deployment.

Figure 6:
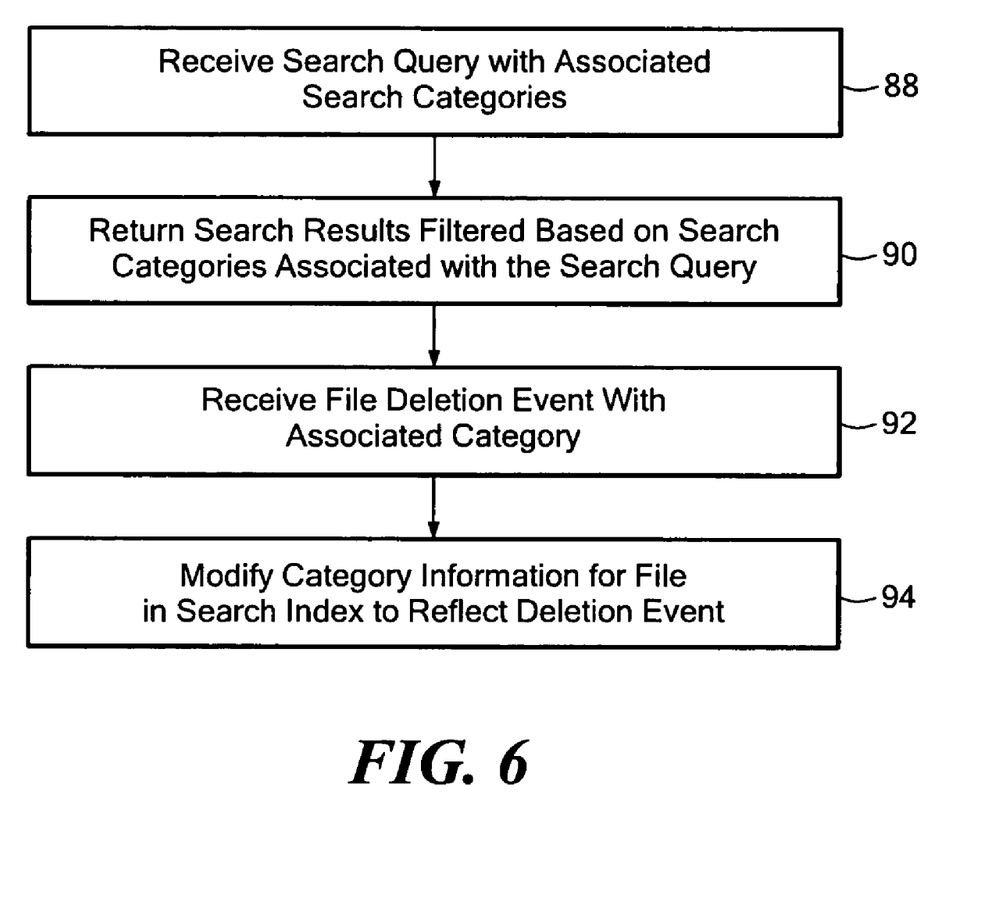
FIG. 6 is a flow chart showing steps performed by an embodiment of the disclosed system.

FIG. 6 is a flow chart showing steps performed by an embodiment of the disclosed system to process a search query. At step 88, the disclosed system receives a search query and one or more search categories. The search categories received at step 88 may indicate one or more client computer systems in a peer to peer network sharing the shared search index. The disclosed system operates to determine search results based on the search categories received at step 88, and returns search results filtered based on those search categories at step 90.

When a copy of a file is deleted by a client computer system, the disclosed system may receive indication of such an event at step 92. The disclosed system may be used to determine whether a file can be deleted from the shared index in response to the category information stored in association with the file. For example, if a file represented in a shared index is associated with multiple client computer systems, category information in the shared search index will indicate each of those multiple host systems. If one of the client computer systems storing a copy of the file deletes its copy of the file, the deletion is detected at step 92 of FIG. 6, and the disclosed system will delete the category information for the file indicating that client computer system at step 94. When all the client computer systems storing copies of the file represented in the shared index have deleted their copies of the file, the disclosed system will determine that the file is associated with no categories, and that the file can accordingly be deleted from the shared index. In this way, the disclosed system enables sharing of a file across multiple client computer systems, and deletion of index information representing a file when it is no longer needed by any client computer system.

FIGS. 1-4 and 6 are block diagram and flowchart illustrations of methods, apparatus(s) and computer program products according to an embodiment of the invention. It will be understood that each block of FIGS. 1-4 and 6, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative program command structures, one skilled in the art will recognize that they may be embodied using a variety of specific command structures.

We claim:

1. A method for providing a search index that is sharable across a plurality of computer systems within a peer to peer network, comprising:

obtaining at least one file for indexing from a first one of said computer systems in said peer to peer network;

determining, responsive to said file and said search index, whether said file is a duplicate of a previously indexed electronic file currently represented in said search index, wherein said previously indexed file is stored on a second one of said computer systems in said peer to peer network;

in the event said file is determined to not be a duplicate of said previously indexed file currently represented in said search index, indexing said file such that said file is represented in said search index;

in the event that said file is determined to be a duplicate of said previously indexed file currently represented in said search index, modifying an existing representation for said previously indexed file in said search index by associating at least one category identifier with said existing representation in said search index, wherein said category identifier indicates said first one of said computer systems in said peer to peer network;

in the event that said file is determined to not be a duplicate of a previously indexed file currently represented in said search index, generating a unique identifier for said file and storing said unique identifier in said search index; and wherein determining whether a subsequently obtained file is a duplicate of a previously indexed file currently represented in said search index includes comparison of a unique identifier associated with said subsequently obtained file with said unique identifier stored in said search index.

2. The method of claim 1, further comprising:

obtaining a search query;

determining, responsive to said search index, a file matching at least one token contained in said search query; and providing search results indicating at least one of said computer systems in said peer to peer network at which said file matching said at least token contained in said search query is stored.

3. The method of claim 1, further comprising:
obtaining a search query;
determining at least one category associated with said search query;
determining, responsive to said search index, at least one file matching at least one token contained in said search query and associated with a category identifier matching said at least one category associated with said search query; and
providing search results indicating said file matching said at least one token contained in said search query and associated with said category identifier matching said at least one category associated with said search query.

4. The method of claim 3, further comprising:
determining, responsive to said search index, at least one file matching at least one token contained in said search query and not associated with said category identifier matching said at least one category associated with said search query; and
wherein said results do not indicate said file matching said at least one token contained in said search query and not associated with said category identifier matching said at least one category associated with said search query.

5. The method of claim 3, further comprising:
wherein said search query is obtained from a source one of said computer systems in said peer to peer network; and
wherein said category associated with said search query indicates at least one other of said computer systems in said peer to peer network that are physically proximate to said source one of said computer systems in said peer to peer network.

6. The method of claim 3, further comprising:
wherein said at least one category associated with said search query includes a plurality of categories; and
wherein said at least one file matching at least one token contained in said search query is associated with at least a plurality of category identifiers matching said plurality of categories associated with said search query.

7. The method of claim 6, wherein said plurality of categories are each associated with ones of said computer systems in said peer to peer network work that are physically proximate to said one of said computer systems in said peer to peer network from which said search query was obtained.

8. A computer system including a computer readable memory, said computer readable memory having program code stored thereon for providing a search index that is sharable across a plurality of computer systems within a peer to peer network, said program code comprising:
program code for obtaining at least one file for indexing from a first one of said computer systems in said peer to peer network;
program code for determining, responsive to said file and said search index, whether said file is a duplicate of a previously indexed electronic file currently represented in said search index, wherein said previously indexed file is stored on a second one of said computer systems in said peer to peer network;
program code for, in the event said file is determined to not be a duplicate of said previously indexed file currently represented in said search index, indexing said file such that said file is represented in said search index;
program code for, in the event that said file is determined to be a duplicate of said previously indexed file currently represented in said search index, modifying an existing representation for said previously indexed file in said search index by associating at least one category identifier with said existing representation in said search index, wherein said category identifier indicates said first one of said computer systems in said peer to peer network;
program code for, in the event that said file is determined to not be a duplicate of a previously indexed file currently represented in said search index, generating a unique identifier for said file and storing said unique identifier in said search index; and
wherein determining whether a subsequently obtained file is a duplicate of a previously indexed file currently represented in said search index includes comparison of a unique identifier associated with said subsequently obtained file with said unique identifier stored in said search index.

9. The system of claim 8, said program code further comprising: program code for obtaining a search query;
program code for determining, responsive to said search index, a file matching at least one token contained in said search query; and
program code for providing search results indicating at least one of said computer systems in said peer to peer network at which said file matching said at least token contained in said search query is stored.

10. The system of claim 8, said program code further comprising:
program code for obtaining a search query; program code for determining at least one category associated with said search query; program code for determining, responsive to said search index, at least one file matching at least one token contained in said search query and associated with a category identifier matching said at least one category associated with said search query; and
program code for providing search results indicating said file matching said at least one token contained in said search query and associated with said category identifier matching said at least one category associated with said search query.

11. The system of claim 10, said program code further comprising:
program code for determining, responsive to said search index, at least one file matching at least one token contained in said search query and not associated with said category identifier matching said at least one category associated with said search query; and
wherein said results do not indicate said file matching said at least one token contained in said search query and not associated with said category identifier matching said at least one category associated with said search query.

12. The system of claim 10, further comprising:
wherein said search query is obtained from a source one of said computer systems in said peer to peer network; and
wherein said category associated with said search query indicates at least one other of said computer systems in said peer to peer network that are physically proximate to said source one of said computer systems in said peer to peer network.

13. The system of claim 10, further comprising:
wherein said at least one category associated with said search query includes a plurality of categories; and
wherein said at least one file matching at least one token contained in said search query is associated with at least a plurality of category identifiers matching said plurality of categories associated with said search query.

14. The system of claim 13, wherein said plurality of categories are each associated with ones of said computer systems in said peer to peer network work that are physically proximate to said one of said computer systems in said peer to peer network from which said search query was obtained.

15. A computer program product for providing a search index that is sharable across a plurality of computer systems within a peer to peer network, comprising:
 a non-transitory computer readable storage medium having program code stored thereon comprising:
 program code for obtaining at least one file for indexing from a first one of said computer systems in said peer to peer network,
 program code for determining, responsive to said file and said search index, whether said file is a duplicate of a previously indexed electronic file currently represented in said search index, wherein said previously indexed file is stored on a second one of said computer systems in said peer to peer network,
 program code for, in the event said file is determined to not be a duplicate of said previously indexed file currently represented in said search index, indexing said file such that said file is represented in said search index, and
 program code for, in the event that said file is determined to be a duplicate of said previously indexed file currently represented in said search index, modifying an existing representation for said previously indexed file in said search index by associating at least one category identifier with said existing representation in said search index, wherein said category identifier indicates said first one of said computer systems in said peer to peer network;
 program code for, in the event that said file is determined to not be a duplicate of a previously indexed file currently represented in said search index, generating a unique identifier for said file and storing said unique identifier in said search index; and
 wherein determining whether a subsequently obtained file is a duplicate of a previously indexed file currently represented in said search index includes comparison of a unique identifier associated with said subsequently obtained file with said unique identifier stored in said search index.

16. The computer program product of claim 15, said program code further comprising:
 program code for obtaining a search query;
 program code for determining, responsive to said search index, a file matching at least one token contained in said search query; and
 program code for providing search results indicating at least one of said computer systems in said peer to peer network at which said file matching said at least token contained in said search query is stored.

17. The computer program product of claim 15, said program code further comprising:
 program code for obtaining a search query;
 program code for determining at least one category associated with said search query;
 program code for determining, responsive to said search index, at least one file matching at least one token contained in said search query and associated with a category identifier matching said at least one category associated with said search query; and
 program code for providing search results indicating said file matching said at least one token contained in said search query and associated with said category identifier matching said at least one category associated with said search query.

18. The computer program product of claim 17, said program code further comprising:
 program code for determining, responsive to said search index, at least one file matching at least one token contained in said search query and not associated with said category identifier matching said at least one category associated with said search query; and
 wherein said results do not indicate said file matching said at least one token contained in said search query and not associated with said category identifier matching said at least one category associated with said search query.

19. The computer program product of claim 17, further comprising:
 wherein said search query is obtained from a source one of said computer systems in said peer to peer network; and
 wherein said category associated with said search query indicates at least one other of said computer systems in said peer to peer network that are physically proximate to said source one of said computer systems in said peer to peer network.

20. The computer program product of claim 17, further comprising:
 wherein said at least one category associated with said search query includes a plurality of categories; and
 wherein said at least one file matching at least one token contained in said search query is associated with at least a plurality of category identifiers matching said plurality of categories associated with said search query.

21. The computer program product of claim 20, wherein said plurality of categories are each associated with ones of said computer systems in said peer to peer network work that are physically proximate to said one of said computer systems in said peer to peer network from which said search query was obtained.

22. The computer program product of claim 15, said program code further comprising:
 program code for, in the event that said file is determined to not be a duplicate of a previously indexed file currently represented in said search index, generating a unique identifier for said file and storing said unique identifier in said search index; and
 wherein determining whether a subsequently obtained file is a duplicate of a previously indexed file currently represented in said search index includes comparison of a unique identifier associated with said subsequently obtained file with said unique identifier stored in said search index.

* * * * *